United States Patent
Dhanaraj et al.

(10) Patent No.: US 9,751,770 B2
(45) Date of Patent: Sep. 5, 2017

(54) SEEDED SILICON CARBIDE FOR DEVICES AND PANELS

(71) Applicant: AYMONT TECHNOLOGY, INC., Ballston Spa, NY (US)

(72) Inventors: Govindhan Dhanaraj, Ballston Spa, NY (US); Larry Burton Rowland, Ballston Spa, NY (US); Jeffery Lee Wyatt, Ballston Spa, NY (US)

(73) Assignee: AYMONT TECHNOLOGY, INC., Ballston Spa, NY (US)

( * ) Notice: Subject to any disclaimer, the term of this patent is extended or adjusted under 35 U.S.C. 154(b) by 820 days.

(21) Appl. No.: 14/248,394

(22) Filed: Apr. 9, 2014

(65) Prior Publication Data

US 2015/0291435 A1    Oct. 15, 2015

(51) Int. Cl.
*C01B 31/36* (2006.01)
*G06K 7/01* (2006.01)
*G04B 39/00* (2006.01)
*G02C 7/02* (2006.01)

(52) U.S. Cl.
CPC ............. *C01B 31/36* (2013.01); *G04B 39/006* (2013.01); *G06K 7/01* (2013.01); *G02C 7/022* (2013.01)

(58) Field of Classification Search
CPC ........ C01B 31/36; G06K 7/01; G04B 39/006; G02C 7/022
See application file for complete search history.

(56) References Cited

U.S. PATENT DOCUMENTS 6,111,821 A * 8/2000 Bach .................... G04B 39/006
                                                    368/280

* cited by examiner

*Primary Examiner* — Michael C Miggins
(74) *Attorney, Agent, or Firm* — Prakash Nama; Global IP Services, PLLC (57) ABSTRACT

Seeded silicon carbide (SiC) for devices and panels are disclosed. In one example embodiment, a device includes a housing and a window. Further, the window is attached to the housing. In this example embodiment, the window of the device is fabricated using the seeded SiC having a single crystalline structure.

19 Claims, 7 Drawing Sheets

SEEDED SILICON CARBIDE FOR DEVICES AND PANELS

BACKGROUND

In general, the marketability of devices may depend on their durability and aesthetic appeal. To ensure durability and to maintain aesthetic appeal, display windows of the devices (e.g., watches and mobile phones) may be provided with a suitable scratch resistant material, such as sapphire, alkali-aluminosilicate and the like. Further, lenses used in the devices (e.g., cameras and eyeglasses) may be made scratch-resistant by using materials, such as polished hard glass plates, lenses and the like. However, the display windows and the lenses made up of these materials may still get scratched by abrasives, such as sandpapers or mineral dust.

In a known method, the display windows of the devices are protected from getting scratched by using protective plastic transparent sheets on the display windows. However, the protective plastic transparent sheets may need to be replaced regularly and the desired aesthetic appeal may be compromised by the usage of such protective plastic transparent sheets.

Further, existing devices use unseeded silicon carbide (SiC) to improve durability and aesthetic appeal. Generally, seeded SiC (SiC is also known as moissanite), one of the hardest known materials, finds many uses due to its hardness. For example, the unseeded SiC or sintered SiC may be used for mechanical applications, such as automobile brakes, clutches, cutting tools and abrasives. The unseeded SiC used for these applications are formed lasing unseeded process, such as sintering, chemical vapor deposition or sublimation. However, an unseeded SiC ingot contains many SiC grains of different orientations and sizes and also of different polytes, which may adversely affect yield and mass production of the unseeded SiC. Moreover, the use of SiC single crystal from the unseeded SiC in applications may require selection of individual SiC crystals having the same size and orientation.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

The application discloses use of single crystalline structured seeded silicon carbide (SiC), in several devices and panels. Particularly, the application discloses use of the single crystalline structured SiC in several devices and panels for window applications as well as aesthetic applications, such as watch glass applications, camera lenses, mobile phone cover panels and the like. Example devices include watches, computing devices (e.g., mobile devices, tablets, laptops and the like), barcode readers, armors, eyeglasses and the like. The term "seeded SiC" means a single SiC element prepared from single crystal bottle grown using a seed crystal. Single crystalline structured seeded SiC may be grown using a seeded process, such as a physical vapor transport (PVT) method or a modified Lely method.

In one embodiment, a window fabricated with the seeded SiC is used as a watch crystal and/or a display panel of the computing device. In another embodiment, lens fabricated with the seeded SiC is used in cameras, microscopes and/or eyeglasses. Further, for devices, such as barcode readers and armors, large-sized SiC windows prepared from seeded SiC ranging from 2 inches to 10 inches in length and 2 inches to 8 inches in width are used. For example, the large-sized SiC windows are made from seeded SiC or formed by joining two or more seeded SiC windows together by diffusion bonding or any other high temperature bonding process.

In the following detailed description of the embodiments of the present subject matter, references are made to the accompanying drawings that form a part thereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to he taken in a limiting sense, and the scope of the present subject matter is defined by the appended claims.

Figure 1:
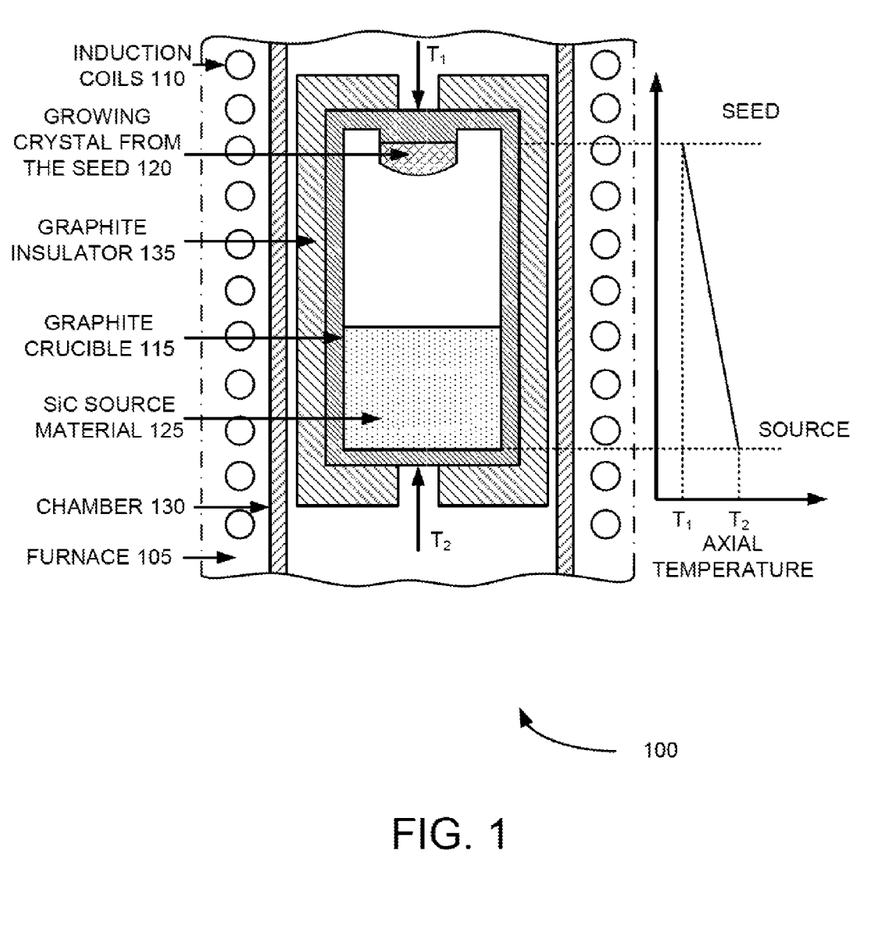
FIG. 1 shows a schematic diagram of a system for growing seeded silicon carbide (SiC), in the context of the present invention.

FIG. 1 shows a schematic diagram of system 100 for growing seeded SiC, in the context of the present invention. Typically, material used for semiconductor applications, such as in Schottky diodes, is grown using a seeded process called seeded sublimation growth. This growth method is stated as seeded SiC or seeded sublimation method in this invention disclosure. This growth method is also described as modified Lely method or seeded physical vapor transport (PVT) growth in the literature. In the seeded sublimation method, SiC source material 125 is held at bottom of crucible or graphite susceptor 115, acid a seed plate (not shown in FIG. 1) is fixed onto a crucible lid or mounted near the lid. The gap between the source material surface and the seed is normally kept small (several mm to a few cm) for achieving reasonable growth rate. It is preferred that SiC source material 125 and the seed be provided within chamber 130. An operating temperature range for SiC crystal 120 growth is 1800-2600° C. with an actual temperature for growth depending on many different process conditions and the chosen polytype (eg., 6H SiC). Induction furnace 105 operating at lower frequencies is normally used for growing SiC single crystals 120. In one example, furnace 105 also includes means for heating crucible 115, such as induction coils 110. Further, crucible 115 is thermally insulated by graphite insulator 135. One skilled in the art can envision that a resistive furnace can also be used for growing SiC single crystals 120. The SiC crystal growth occurs at a selected controlled argon pressure chosen within a range of 1-150 mbar. The seed is kept slightly cooler than source material (T1<T2) (see FIG. 1). SiC source material 125 sublimes and gets transported vertically due the presence of axial temperature gradient and gets deposited on the seed and grows in the form of bulk SiC crystal 120.

Figure 2:
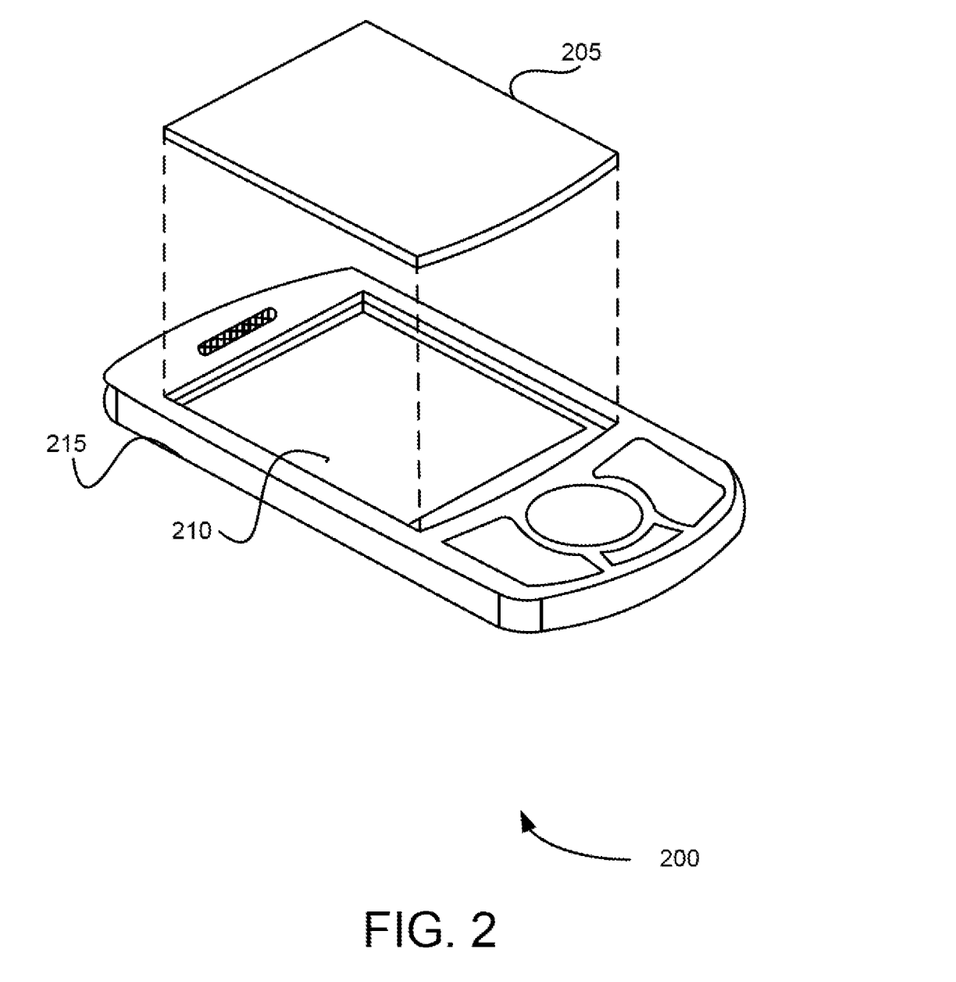
FIG. 2 illustrates an example device having a window fabricated using seeded SiC, according to an embodiment.

FIG. 2 illustrates example device 200 having window 205 fabricated using seeded SiC, according to an embodiment. Example device 200 includes a watch, a computing device (e.g., a mobile phone, a tablet and the like), and so on. As shown in FIG. 2, window 205 is attached to housing 215. For example, window 205 is attached to housing 215 by an adhesive substance, adhesive film and/or mechanical fittings. Further, window 205 is fabricated using seeded SiC having a single crystalline structure, with a crystallographic orientation of 0° to 90° with respect to C-axis. The term "C-axis" refers to a direction normal to a crystallographic c-plane of SiC. In one example embodiment, the seeded SiC is composed of 4H, 6H, 8H, 15R, 21R, 31R or any other polytypes of SiC. Furthermore, it can be envisioned that window 205 can be fabricated in various shapes including circular, elliptical, and polygon, such as square, rectangular and so on. Also, window 205 can have a thickness ranging from 0.07 mm to 7 mm, based on type of device 200. Additionally, window 205 can be made colored, nearly colorless or transparent based on the presence of dopants in the seeded SiC. In some embodiments, window 205 is polished or partially polished by mechanical means using diamond abrasives or combination of mechanical and chemical methods. Further, window 205 can be fabricated with an integrated lens (not shown in FIG. 2) to magnify content on display 210 of device 200.

For example, consider device 200 as shown in FIG. 2 as a mobile phone. The mobile phone includes housing 215, display 210 and window 205 fabricated using the seeded SiC having the single crystalline structure. In some embodiments, window 205 can be detached or can be retrofitted to housing 215. Additionally, the mobile phone may include a camera lens provided with or without camera window fabricated using the seeded SiC having the single crystalline structure. The usage of the seeded SiC in window 205 and the camera window makes window 205 and the camera window wear-resistant.

Figure 3:
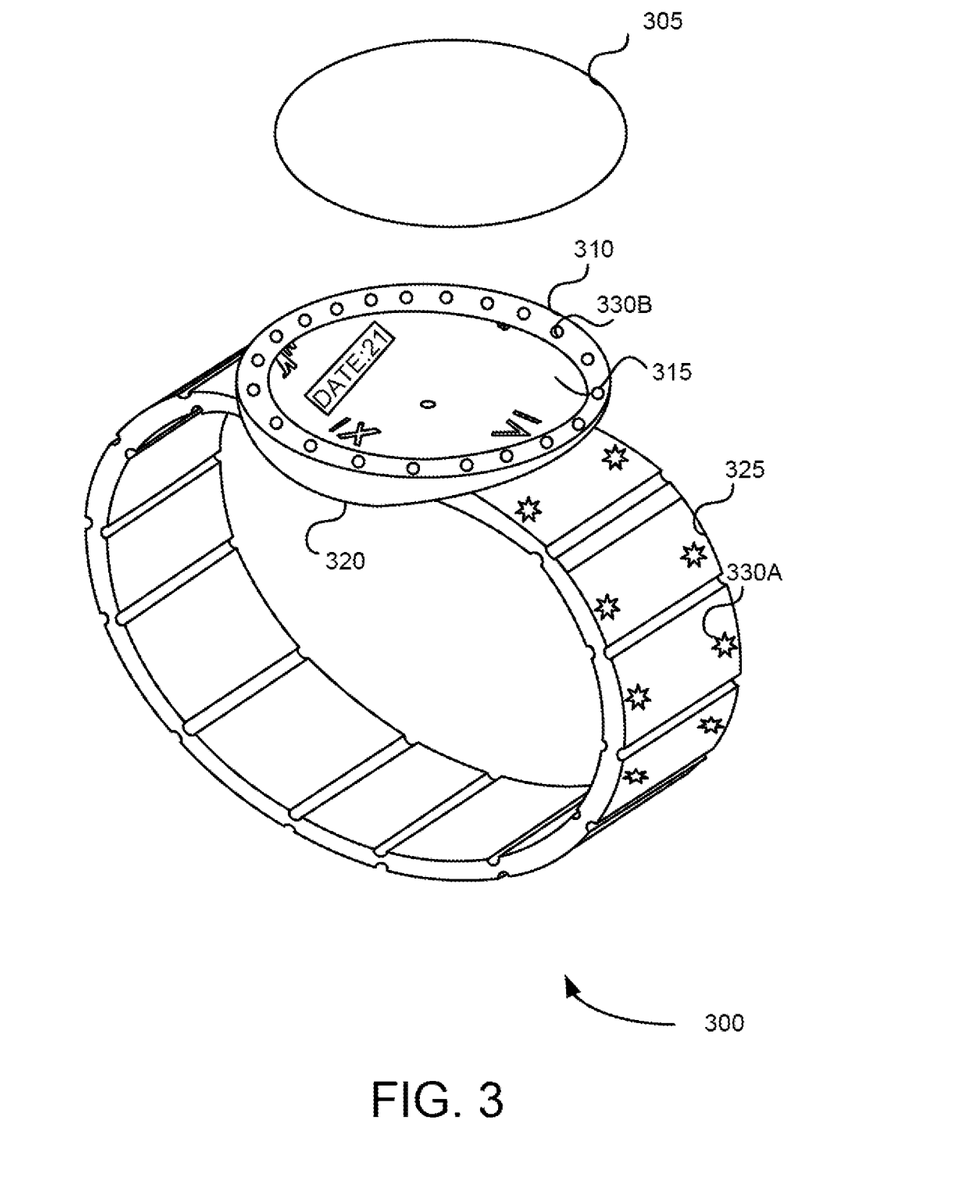
FIG. 3 illustrates an exam gale wristwatch having a watch crystal fabricated using the seeded SiC and decorative seeded SiC crystals studded on a watch case and a watch strap, according to an embodiment.

Referring now to FIG. 3, which illustrates example wristwatch 300 having watch crystal 305 fabricated using the seeded SiC and decorative seeded SiC crystals studded on watch case 310 and watch strap 325, according to an embodiment. For example, the decorative seeded SiC crystals can be fabricated in various shapes including circular, elliptical, polygon, square, rectangular and so on. In one example, star-shaped decorative seeded SiC crystals 330A are studded on watch strap 325, as shown in FIG. 3. In another example, circular shaped decorative seeded SiC crystals 330B are studded on watch ease 310, as shown in FIG. 3. Further, the usage of the decorative seeded SiC crystals on watch strap 325 and watch case 310 adds decorative or ornamental value to watch 300.

Further, as shown in FIG. 3, watch case 310 (i.e., housing) includes back cover 320, watch crystal 305, and dial 315. In one embodiment, back cover 320 can also be fabricated using the seeded SiC has the single crystalline structure. This is explained in more detail with reference to FIG. 4. In one example, watch crystal 305 is attached to watch case 310. For example, watch crystal 305 is attached to watch case 310 by an adhesive, a screw, a mechanical press-fit and the like. In one embodiment, watch crystal 305 can be detached or retrofitted to watch case 310. Additionally, watch crystal 305 can be made colored, nearly colorless or transparent based on the presence of dopants in the seeded SiC. Further, watch crystal 305 is polished or partially polished. In another embodiment, watch crystal 305 is fabricated with an integrated lens to magnify specific content on dial 315. For example, content, such as date and month on dial 315 can be magnified by fabricating watch crystal 305 with an integrated lens. The usage of the seeded SiC in watch crystal 305 makes watch crystal 305 wear resistant.

Figure 4:
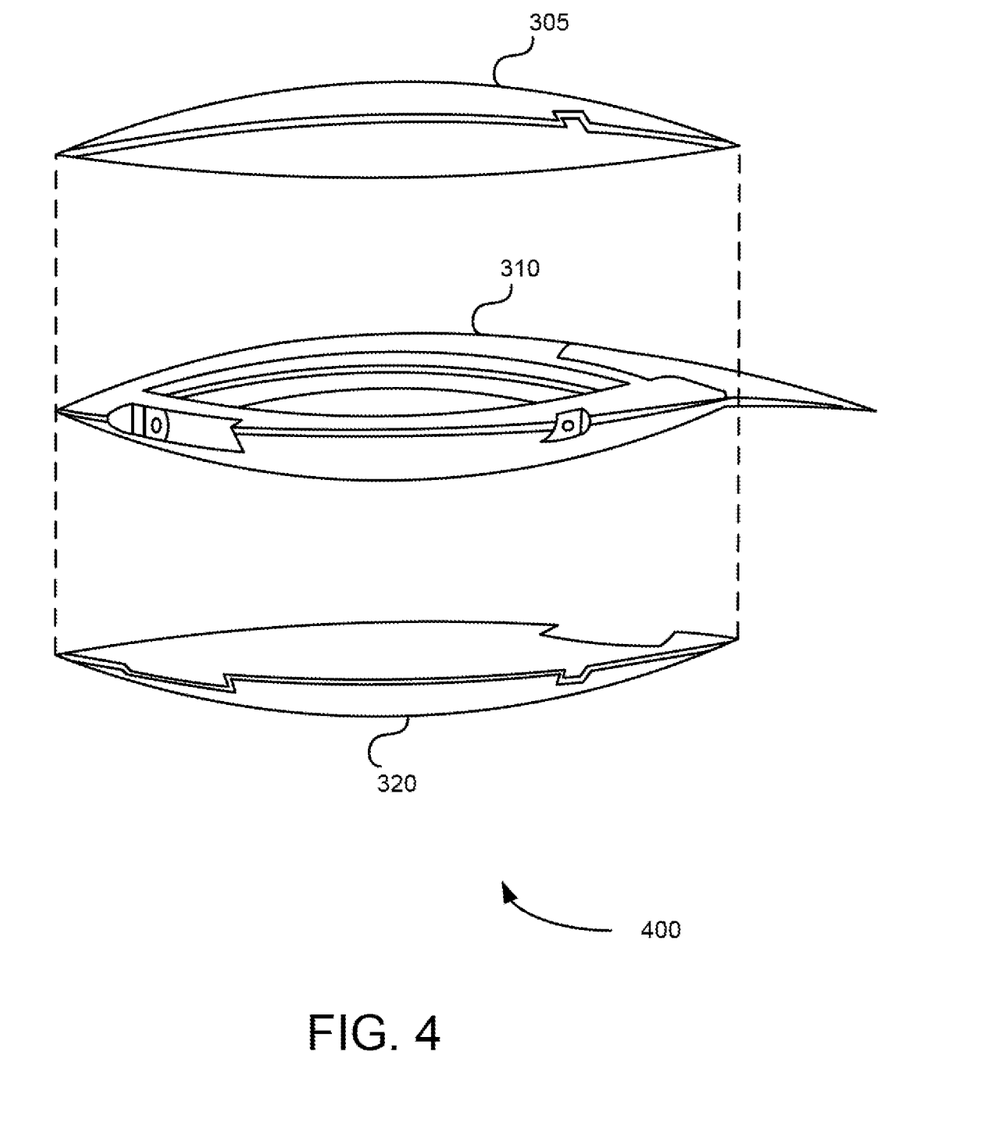
FIG. 4 is an exploded view of the watch case illustrating the watch crystal and a back cover as shown in FIG. 3, fabricated using the seeded SiC, according to an embodiment.

Referring now to FIG. 4, which is exploded view 400 of watch case 310 including watch crystal 305 and back cover 320, as shown in FIG. 3, fabricated using the seeded SiC, according to an embodiment. As shown in FIG. 4, watch crystal 305 and back cover 320 are fabricated using the seeded SiC having the single crystalline structure. The usage of the seeded SiC in watch crystal 305 and back cover 320 makes watch 310 scratch resistant and transparent, and therefore, results in an ornamental scratch resistant see-through watch.

Figure 5:
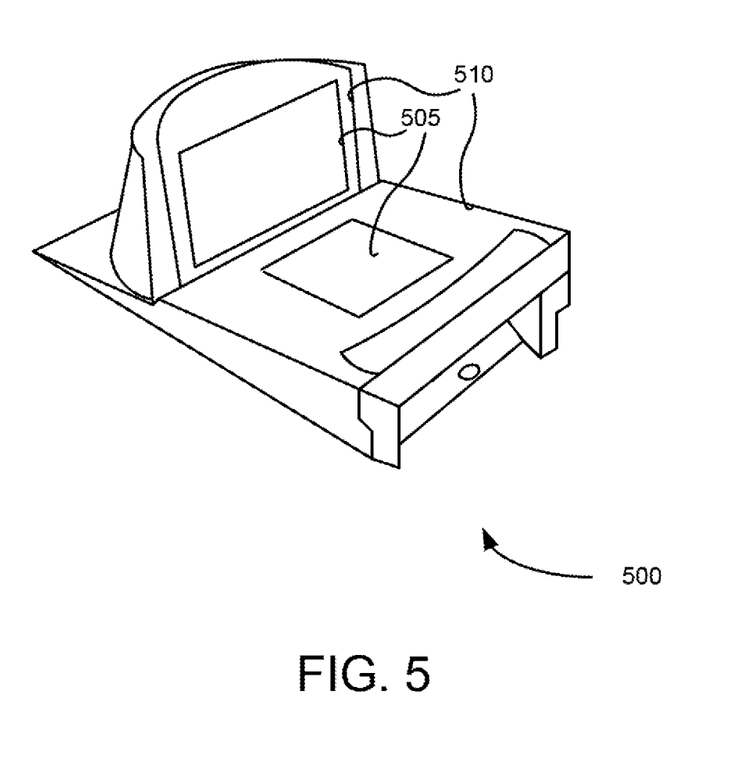
FIG. 5 illustrates an example barcode reader having large sized seeded SiC windows, according to an embodiment.

Referring now to FIG. 5, which illustrates example barcode reader 500 having large sized seeded SiC windows 505, according to an embodiment. As shown in FIG. 5, barcode reader 500 includes large-sized seeded SiC windows 505 attached to housing 510. Further, large-sized seeded SiC windows 505 are fabricated by joining two or more seeded SiC windows (e.g., window 205 of FIG. 2) by diffusion bonding or any high temperature bonding process in presence of catalysts. In one example diffusion bonding process, a thin polycrystalline SiC layer is inserted between the two edges of SiC windows. Applying temperature and pressure promotes diffusion and growth of the SiC crystal across the bond interface to produce high strength bond. In one example, the two or more seeded SIC windows are fabricated using the seeded SiC having the single crystalline structure.

Figure 6:
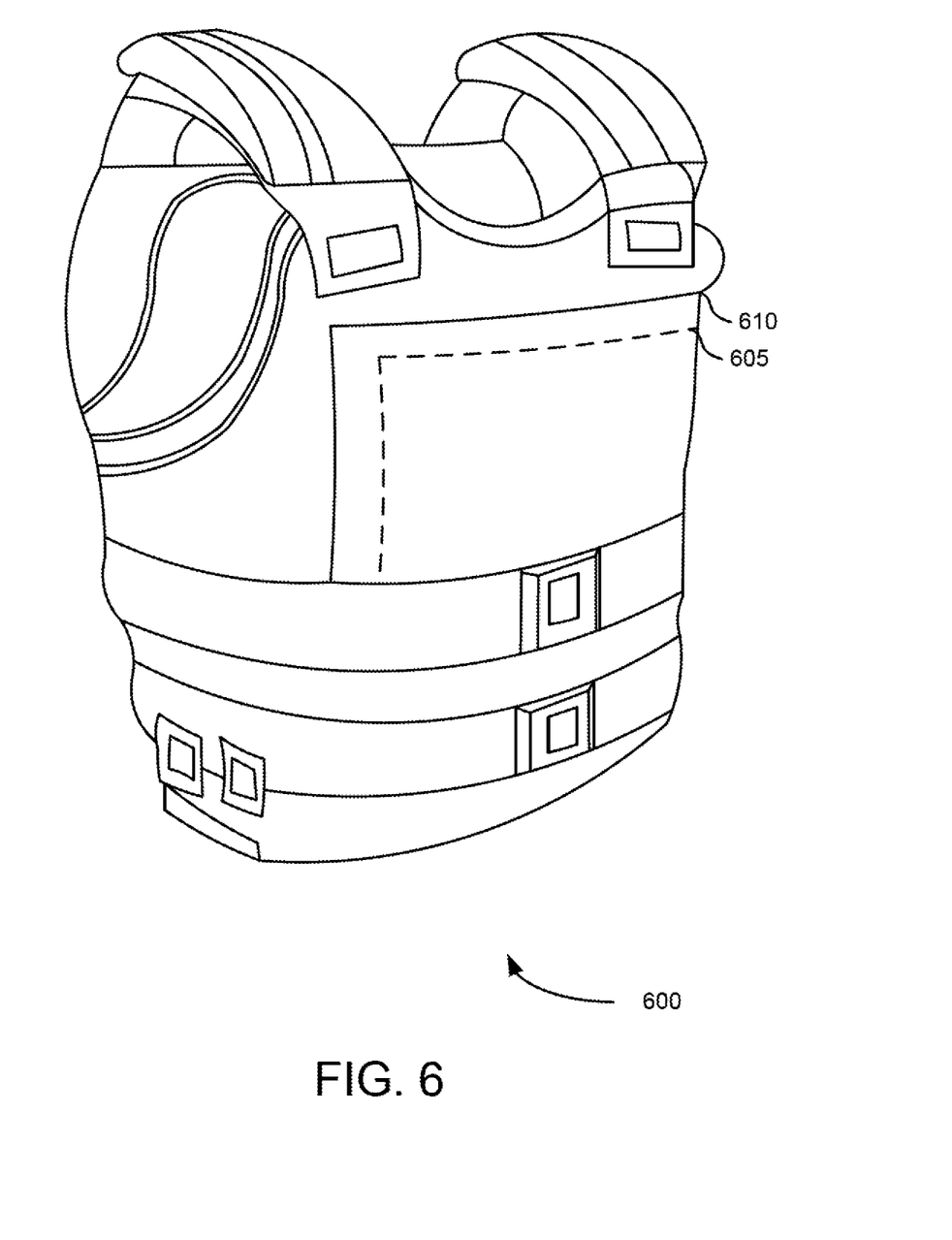
FIG. 6 illustrates an example bullet proof vest having a large sized seeded SiC window as an armor plate, according to an embodiment.

Referring now to FIG. 6, which illustrates example bulletproof vest 600 having a large sized seeded SiC window as armor plate 605, according to an embodiment. As shown in FIG. 6, bulletproof vest 600 includes armor plate 605 attached to housing 610. Further, armor plate 605 is the large sized seeded SiC window fabricated by joining two or more seeded SiC windows (e.g. window 205 of FIG. 2), by diffusion bonding or any high temperature bonding process in presence of catalysts. In one example, the two or more seeded SiC windows are fabricated using seeded SiC having the single crystalline structure. Additionally, in some embodiments, the large-sized seeded SiC windows can be used in large display panels for mobile phones, tablets, laptops and the like.

Figure 7:
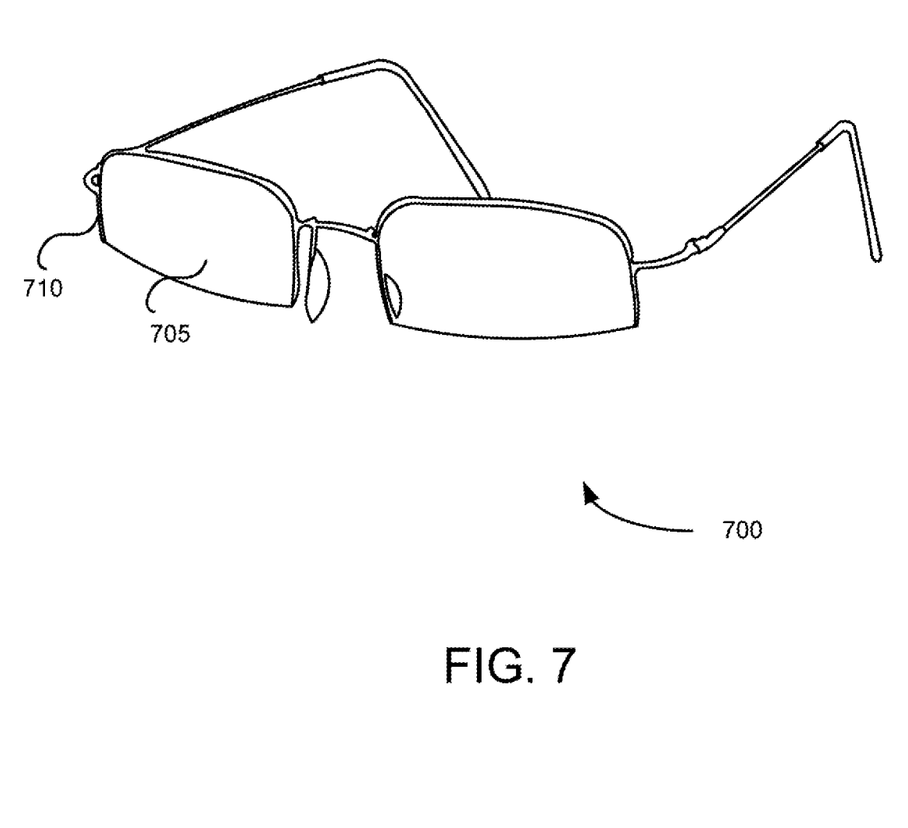
FIG. 7 illustrates example eyeglasses with lenses fabricated using the seeded SiC, according to an embodiment.

Referring now to FIG. 7, which illustrates example eyeglasses 700 with lenses 705 fabricated using the seeded SiC, according to an embodiment. Eyeglasses 700 include frame 710 to which lenses 705 are attached. Further, lenses 705 are fabricated using the seeded SiC having the single crystalline structure. In one embodiment, lenses 705 are fabricated from same polytype (e.g., 4H, 6H 8H, 15R, 21R or 31R) of SiC, having the crystallographic orientation of 0° to 90°0 with respect to the C-axis. Furthermore, the usage of the seeded SiC makes lenses 705 wear-resistant and also adds decorative or ornamental value to eyeglasses 700. In one embodiment, lenses 705 can be made of different colors based on the presence of dopants in the seeded SiC. In addition, lenses (e.g., lenses 705) of image capturing devices (e.g. camera, microscope and the like) can also be fabricated using the seeded Si having the single crystalline structure.

From the foregoing it will be appreciated that, although specific embodiments have been described herein for purposes of illustration, one skilled in the art can envision making various modifications without deviating from the spirit and scope of this disclosure.

What is claimed is:

1. A device, comprising:
   a housing; and
   a window attached to the housing, the window fabricated using seeded silicon carbide (SiC) comprising a single crystalline structure.

2. The device of claim 1, wherein the seeded SiC comprises a crystallographic orientation of 0° to 90° with respect to C-axis.

3. The device of claim 1, wherein the window comprises a thickness of 0.07 mm to 7 mm.

4. The device of claim 1, wherein the seeded SiC is selected from the group consisting of 4H, 6H, 8H, 15R, 21R, 27R, and 31R polytypes of SiC.

5. The device of claim 1, wherein the Window comprises an integrated lens capable of magnifying content.

6. The device of claim 1, wherein the window comprises a shape selected from a circle, an ellipse and a polygon.

7. The device of claim 1, wherein the is substantially transparent or colored based on dopants in the seeded SiC.

8. The device of claim 1 wherein the housing comprises a back cover fabricated using the seeded SiC comprising the single crystalline structure.

9. The device of claim 1, wherein the window s selected from the group consisting of a watch crystal, a display panel of a computing device, an armor plate and a barcode reader window.

10. The device of claim 1, wherein the device is selected from the group consisting of a computing device, a watch, an armor, a barcode reader, an image capturing apparatus, a microscope and eyeglasses.

11. A device, comprising:
    a housing; and
    a lens attached to the housing, the lens fabricated using seeded SiC comprising a single crystalline structure.

12. The device of claim 1, wherein the device is selected from the group consisting of an image capturing apparatus, a microscope and eyeglasses.

13. The device of claim 11, wherein color of the lens is based on dopants in the seeded SiC.

14. A window of a device fabricated with seeded SiC comprising a single crystalline structure.

15. . The window of claim 14, wherein the seeded SiC is selected from the group consisting of 4H, 6H, 8H, 15R, 21R, 27R, and 31R polytypes of SiC.

16. The window of claim 14, wherein the device is selected from the group consisting of a computing device, a watch, an armor, a barcode reader, an image capturing apparatus, a microscope and eyeglasses.

17. The window of claim 14, wherein the window comprises a thickness of 0.07 mm to 7 mm.

18. The window of claim 14, wherein the window comprises an integrated lens capable of magnifying content.

19. The window of claim 14, wherein the window comprises a shape selected from a circle, an ellipse and a polygon.

* * * * *